US 7,367,508 B2

(12) United States Patent
Christian

(10) Patent No.: US 7,367,508 B2
(45) Date of Patent: May 6, 2008

(54) SYSTEM AND METHOD FOR TRACKING URL USAGE

(75) Inventor: Brian S. Christian, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 471 days.

(21) Appl. No.: 10/948,235

(22) Filed: Sep. 24, 2004

(65) Prior Publication Data

US 2006/0095558 A1 May 4, 2006

(51) Int. Cl.
*G06K 7/10* (2006.01)
(52) U.S. Cl. .................. 235/462.01; 235/375; 235/380
(58) Field of Classification Search ........... 235/462.01, 235/375, 380
See application file for complete search history.

(56) References Cited

U.S. PATENT DOCUMENTS

| 5,434,974 | A | 7/1995 | Loucks et al. |
| 5,659,729 | A | 8/1997 | Nielsen |
| 5,706,501 | A | 1/1998 | Horikiri et al. |
| 5,774,660 | A | 6/1998 | Brendel et al. |
| 5,961,645 | A | 10/1999 | Baker |
| 6,078,929 | A | 6/2000 | Rao |
| 6,557,024 | B1 | 4/2003 | Saito et al. |
| 6,725,214 | B2 | 4/2004 | Garcia-Chiesa |
| 2003/0056224 | A1 | 3/2003 | Stone |
| 2003/0074472 | A1 | 4/2003 | Lucco et al. |
| 2003/0229900 | A1 | 12/2003 | Reisman |
| 2004/0220845 | A1* | 11/2004 | Malapitan ...................... 705/8 |

* cited by examiner

*Primary Examiner*—Karl D. Frech
(74) *Attorney, Agent, or Firm*—Shook, Hardy & Bacon, L.L.P.

(57) ABSTRACT

A system and method are provided for incorporating a client-side tracking system in conjunction with a tracking server to track URL usage. The method includes implementing the client-side tracking system for preserving a target URL upon tracking. The method additionally includes providing a failsafe mechanism for directing a client to the target URL from the client-side tracking system upon detection of tracking server failure by the client-side tracking system. The client-side tracking system includes an event detection mechanism for detecting occurrence of one of a tracking server URL logging event and a tracking server timeout event. The client-side tracking system additionally incorporates tracking information including a stored target hyperlink reference accessible to the client-side tracking system for directing the client to the selected URL upon detection of an event by the event detection mechanism.

34 Claims, 7 Drawing Sheets

SYSTEM AND METHOD FOR TRACKING URL USAGE

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to a system and method for tracking universal resource locator (URL) usage. More particularly, embodiments of the invention relate to tracking URL usage while maintaining a contextual relationship between a destination and a target URL and providing a fail-safe mechanism for reaching the target URL.

BACKGROUND OF THE INVENTION

Businesses today that use commercial web sites to convey information have an interest in tracking statistics regarding visitor activity. Commercial web sites today often aim to track usage as measured by the number of users viewing specific pieces of content.

In order to track usage, mining data out of web logs on a web server is not a viable solution. The act of logging every single interaction on a web site would be cost prohibitive and slow down web site performance. Furthermore, such a technique would provide more information than necessary. Businesses typically are not interested in recording every user action on a web site and are generally satisfied with a count of user visits through each link.

Typically, commercial web sites implement tracking servers to track URL usage from a partner server having one or more links to the commercial web site. Generally, tracking information is encoded into a URL. The tracking information may include such information as the data link selected from the partner web site to initiate the content request and the rendered content page from which the content request originated. Software in the tracking server logs information and redirects the user browser to the location of the link that the user wanted to reach. When a user clicks on a link in a partner web site, after tracking, the user receives a completely random looking string of numbers and letters that has no relevance to the user's selected destination For example, services are available through which participating web sites can each set up their own namespace on a tracking server, complete with all the URLs to which they expect their users to be redirected, and then begin using URLs that point to a single address.

While tracking servers may be able to keep an accurate count, the current technique for using tracking servers creates several implementation difficulties. First, if the tracking server is down or otherwise inaccessible, all the links on the web site being tracked will become unusable even though the web site being tracked is healthy. Even if the user selects a link to a different page on the same web site he is currently visiting, if the tracking server is not operating properly, the user will be unable to access the page. If something blocks the user from getting to the tracking server such as network latency or network outage, the user will be unable to visit the location referenced by the target URL. The web site operator will probably be unaware of the outage unless users call product support.

Secondly, after tracking, all of the links will have lost their context. In other words, a URL that used to point to "http://entertainment.msn.com/movies" may now point to "http://g.msn.com/ent.345/?ps=123&cm=321&ce=5". The tracking URL is typically a nonsensical combination of letters and/or numbers that provides no contextual information about the destination and bears little relation to the target URL content, thus causing confusion to the user. If this resultant tracking link is copied and saved or sent to a friend, it is not possible to infer what property this link accesses. In addition to user confusion, the tracking URL has little meaning to search index systems that also rely on URL content for indexing. If a web site is indexed by a web search index system such as Google, the algorithms of the web search index system apply weight to context that can be inferred from a URL. Accordingly, if ten external partner web sites point to one page on a target web site and all of the external web sites have information in the URL that allows the heuristics of the web search index system to determine context, then that one page that has those ten links referencing it is going to rank much higher in search results than other pages. For instance if user implements a browser to search for Barry Manilow, a web site operator having a page pertaining to Barry Manilow would want the user to be able to access the page. Accordingly, the web site owner would want his or her Barry Manilow page to be referenced by a URL that will promote high-ranking search results. Because of the emphasis that many contemporary search algorithms apply to the URL of a given page being indexed, it has become increasingly important to provide clues as to the content of a web page within its destination URL.

A further implementation difficulty with existing tracking servers includes the necessity for registering each URL with the tracking server. Each web site that uses a tracking server for tracking often must pre-disclose or register URLs in a namespace on the tracking server.

A solution is needed that allows contextually relevant URLs to be maintained during tracking procedures to enable web sites to participate fully in web search engines and to enable users to discern target web site content from the URL. A solution is additionally needed for allowing user link usage even when a tracking server outage has occurred. Furthermore, a solution is needed that eliminates any existing requirement to pre-disclose or register each URL with a tracking server.

BRIEF SUMMARY OF THE INVENTION

Embodiments of the present invention include a method for incorporating a client-side tracking system in conjunction with a tracking server to track URL usage. The method includes implementing the client-side tracking system for preserving a target URL upon tracking. The method additionally includes providing a failsafe mechanism for directing a client to the target URL from the client-side tracking system upon detection of tracking server failure by the client-side tracking system.

In an additional aspect of the invention, a client-side tracking system for use in conjunction with a tracking server for tracking use of a selected URL is provided. The client-side tracking system includes an event detection mechanism for detecting occurrence of one of a tracking server URL logging event and a tracking server timeout event. The client-side tracking system additionally incorporates tracking information including a stored target hyperlink reference in the client-side tracking system for directing the client to the selected URL upon detection of an event by the event detection mechanism.

In yet a further aspect of the invention, a method is provided for incorporating a client-side tracking system to monitor tracking server processing in order to ensure user access to a selected URL. The method includes monitoring occurrence of a tracking server timeout in accordance with a selected threshold. Upon occurrence of a tracking server timeout, the method includes directing the user to the selected URL using the client-side tracking mechanism.

In an additional aspect of the invention, a client-side tracking system is provided for use in conjunction with a tracking server for tracking use of a selected URL. The client-side tracking system includes a configurable timer for setting a threshold that determines a tracking server timeout on the client-side and a timeout event handler for recording the timeout and ensuring direction of a user to the selected URL.

BRIEF DESCRIPTION OF THE DRAWINGS

The present invention is described in detail below with reference to the attached drawings figures, wherein.

DETAILED DESCRIPTION OF THE INVENTION

I. System Overview

Figure 1:
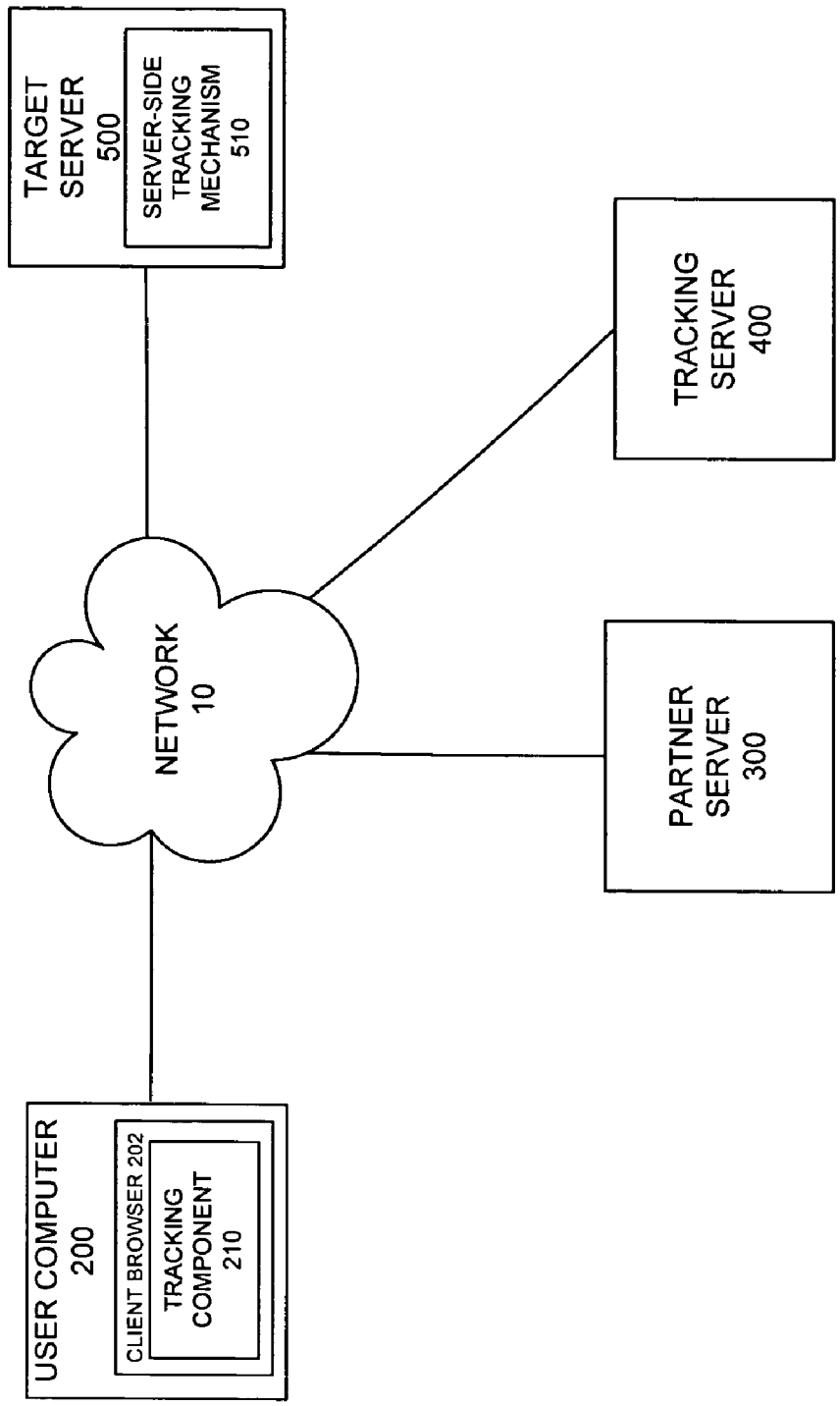
FIG. 1 is a block diagram illustrating an overview of a system in accordance with an embodiment of the invention.

Embodiments of the invention include a method and system for tracking URL usage in a tracking server environment while preserving a contextual URL and preventing the appearance of a target web site failure due to tracking server failures. FIG. 1 illustrates an overview of an operating environment for a method and system of the invention. A user computer 200, a partner server 300, a tracking server 400, and a target server 500 may all be connected over a network 10. The network 10 may be or include the Internet or other network that will be described below with reference to FIG. 3. In embodiments of the invention, the tracking server 400 may be implemented on the same or on a different computing device from the target server 500. The partner server 300 and the target server 500 may be implemented on the same or different computing devices.

The user computer 200 may include a client browser 202 and a tracking mechanism 210 on the client browser 202 for tracking user activities. The tracking mechanism 210 is further described below with reference to FIG. 2

The target server 500 may include a server side tracking mechanism 510. The server side tracking mechanism 510 is further described below with reference to FIG. 4.

In operation, the user computer 200, using the user browser 202, may visit a page on the partner server 300 and may select a URL hyperlink provided by the partner server 300 that leads to a web page served by the target server 500. Thus, the partner server 300 may provide one or more links to connect with the target server 500. Because the target server 500 may want a count of the number of times that a link within the partner server 300 is accessed, the partner server may be connected with a tracking server 400 that provides a tracking function.

Figure 2:
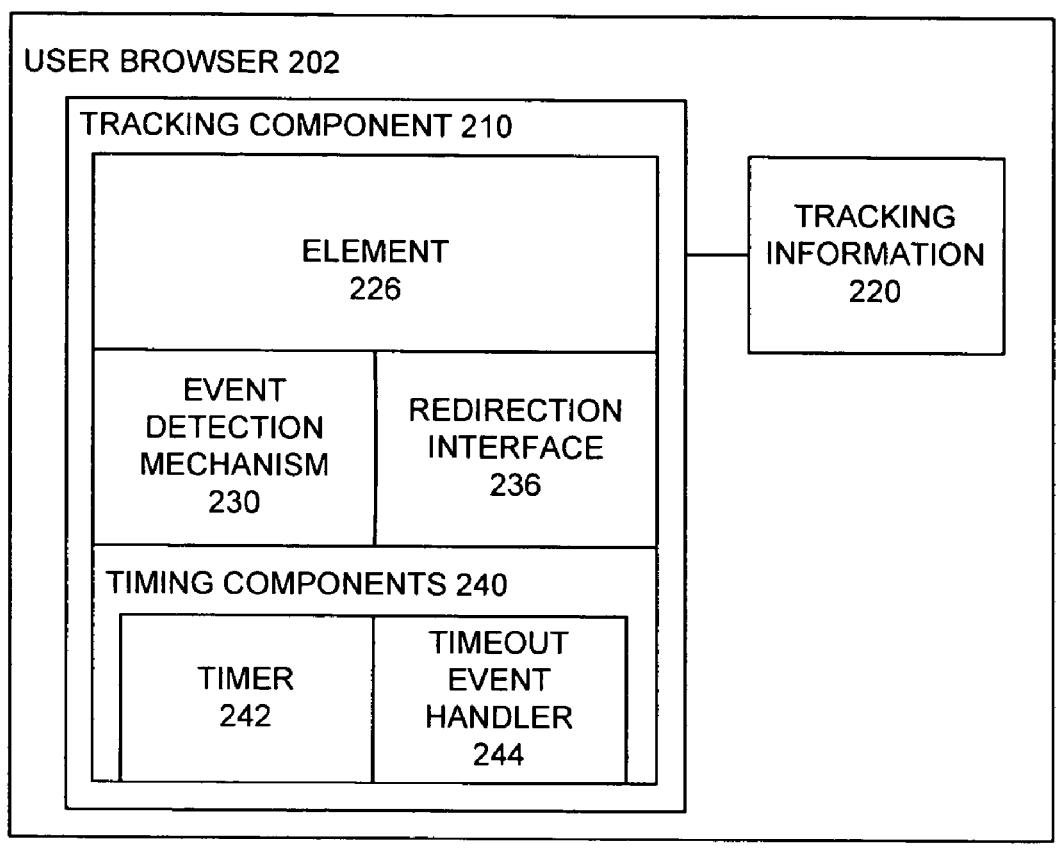
FIG. 2 is block diagram illustrating a tracking component of the system in accordance with an embodiment of the invention.

FIG. 2 further illustrates the tracking component 210 in accordance with an embodiment of the invention. While the details of the tracking component 210 will be further explained below, the tracking component 210 may be or include an external java script URL tracking program or other file or executable contained within the client browser 202 on the user computer 200. The tracking component 210 may further include an invisible object or element and in embodiments of the invention includes an embedded image tag. The tracking program is initiated when a user selects a URL, which will be explained further below with reference to the methods in accordance with embodiments of the invention. In accordance with embodiments of the invention, the selected URL remains the URL of the target web site. The tracking component 210 times the tracking server process such that if a timeout occurs prior to an event such as an image event associated with the embedded image tag, the client-side tracking component 210 enables direct access from the user computer 200 to the target URL. If the tracking request is completed prior to the timeout, then the tracking server 400 tracks the usage as intended.

The tracking component 210 provides a primary interface to tracking servers 400, providing failsafe or self-healing behavior. In the event of a tracking server failure, the tracking component 210 enables the user computer 200 to get to the link the user selected. The tracking component 210 further enables the target server 500 to track the occurrences of the above-mentioned failsafe behavior. The tracking component further allows the client browser 202 to see the actual URL of the target rather than a cryptic encoded URL that results in a redirect. The tracking component 210 further allows search engines to more accurately determine the URLs on the pages being indexed.

All of the components described above with respect to FIGS. 1 and 2 may be implemented in a computerized environment as described below with respect to FIG. 3.

II. Exemplary Operating Environment

Figure 3:
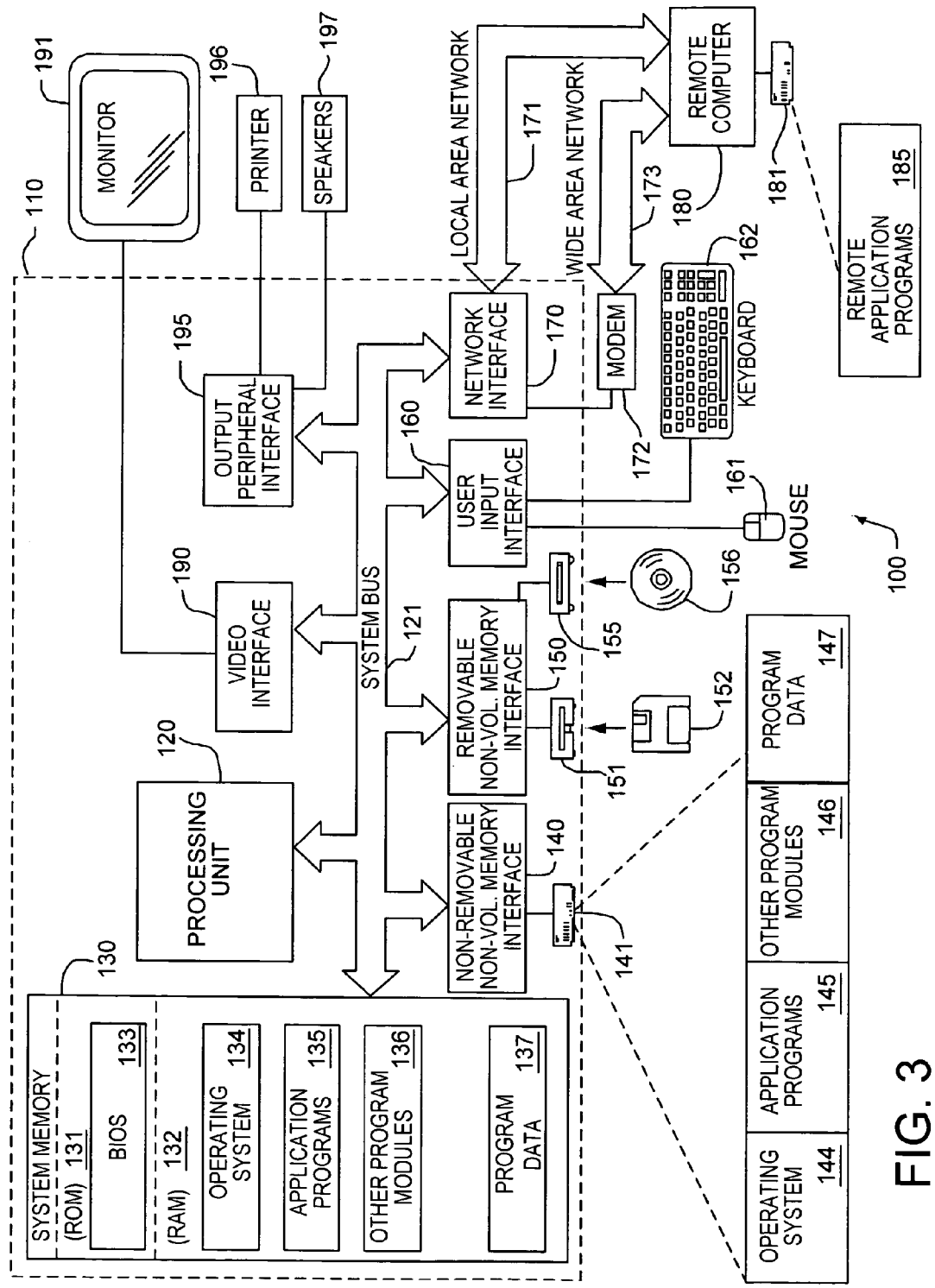
FIG. 3 is a is a block diagram illustrating a computerized environment in which embodiments of the invention may be implemented.

FIG. 3 illustrates an example of a suitable computing system environment 100 on which the tracking component 210 may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 3, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/nonremovable, volatile/nonvolatile computer storage media. By way of example only, FIG. 3 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIGS. 1 and 2 illustrate the system of the invention. FIG. 2 illustrates a client-side tracking component 210 that includes a tracking method. The tracking method and all of its constituent functionality may be embedded in the web page via an external java script or other type of file or executable. In addition, an element or object is embedded in the page, which may, in embodiments of the invention, be or include a non-visible embedded image element. The implementation may occur in a toolbar and supports out of band interactivity.

As shown in FIG. 2, the tracking component 210 may include for example, an element or object 226, an event detection mechanism 230, a tracking interface 236, and timing components 240. The timing components 240 may include a timer 242 and a timeout event handler 244. Additionally, the tracking component may access tracking information 220.

The tracking information 220 may relate to timing thresholds, timeout cookies, a hyperlink reference, or other values or information that may be useful in the tracking process. This information is further explained below with respect to the method of the invention.

As set forth above, the object or element 226, may for example be a non-visible image element and may be embedded in a server page. The element 226 is coordinated with the tracking server 400 such that an element load event occurs only when the tracking server 400 successfully logs an event and redirects the user. The event detection mechanism 230 detects the occurrence of events such as the element load event and timeout events. The tracking interface 236 establishes communication with the tracking server 400 so that event detection can be accomplished and tracking information can be recorded.

The timing components 240 may include a timer 242 and a timeout event handler 244. A timeout threshold may be set at the target server 500 or the partner server 300 and is served to the client inside the java script or other type of code or executable within the tracking mechanism 210. This timeout threshold may be adjusted as needed. The timeout threshold should be set to prevent tracking server failure from blocking a user from gaining access to a target URL. The period of time that a given session is suspended from being tracked is also configurable from the target server 500 or the partner server 300 and is set inside of the client-side tracking mechanism 210 using the timing components 240.

Figure 4:
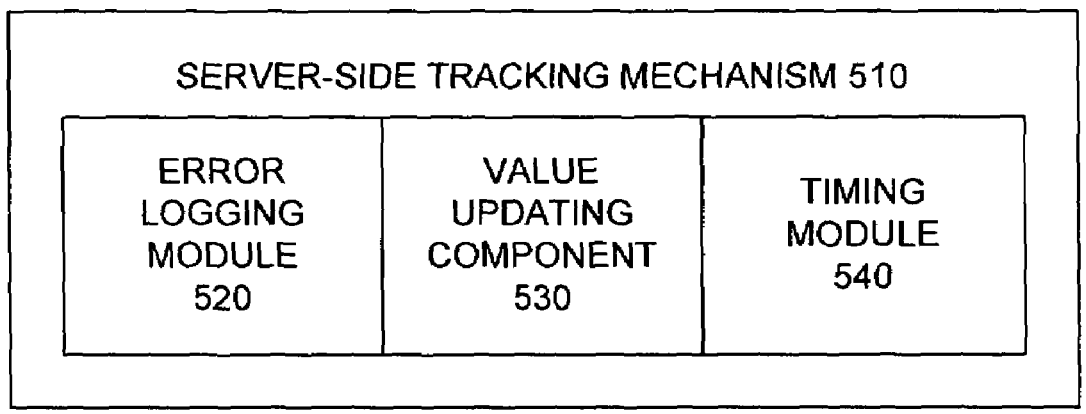
FIG. 4 is a block diagram illustrating a server-side tracking mechanism in accordance with an embodiment of the invention.

FIG. 4 illustrates details of the server-side tracking mechanism 510 that may be implemented on the target server 500 to interact with the tracking component 210 in accordance with embodiments of the invention. The server-side tracking mechanism 510 may include an error logging module 520, a value updating component 530, and a timing module 540. The server-side tracking mechanism 510 changes the cookie value using the value updating component 530 so that client browser 202 can continue using the site without incrementing a count of people who have timed out. The server-side error-logging module 520 may flag the client-side portion indicating timing out. The timing module 540 may allow setting of an appropriate time out threshold.

Figure 5:
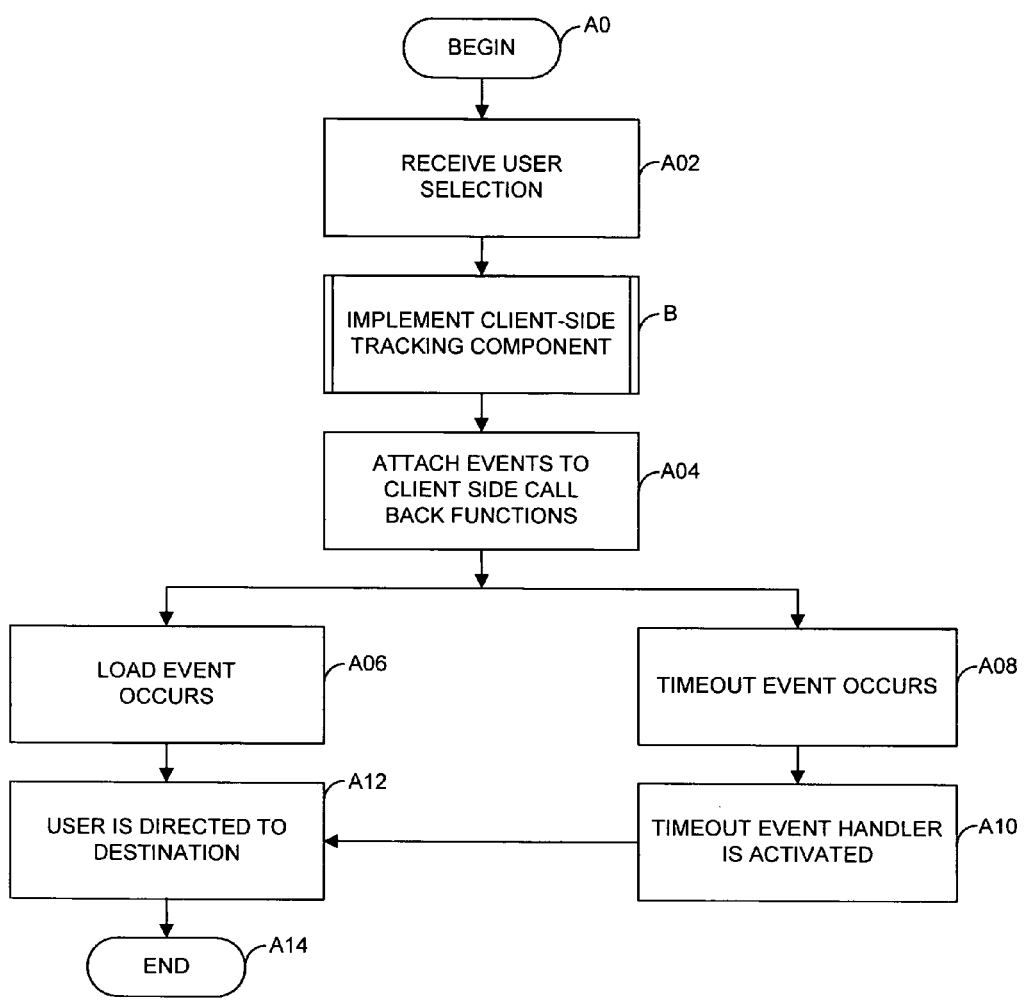
FIG. 5 is a flow chart illustrating a client-side process flow in accordance with an embodiment of the invention.

FIG. 5 illustrates a tracking method in accordance with an embodiment of the invention. The method begins in step A0 while the user is viewing a web page, for example, a web page served by the partner server 300. As the page is initially being served, the tags of an anchor that mark the beginning and end of a hyperlink reference (href) are encoded to contain not only the standard href attribute, but also a custom attribute named "data", as well as being related with the client-side tracking method. For example, <a href='http://.msn.com' data='ps/cm/ce" onclick='return track(this);'>My Link</a>. In step A02, the tracking mechanism 210 receives a user URL selection. The user clicks an anchor element, encoded as described above. In process B, the client-side tracking method is implemented using the tracking method of the component 210. As set forth above, the tracking method and its constituent functionality may be embedded in the web page via an external java script or other type of file or executable. The tracking method may be called by passing in a reference to the actual link element. The details of the tracking method B are shown in FIG. 6.

Figure 6:
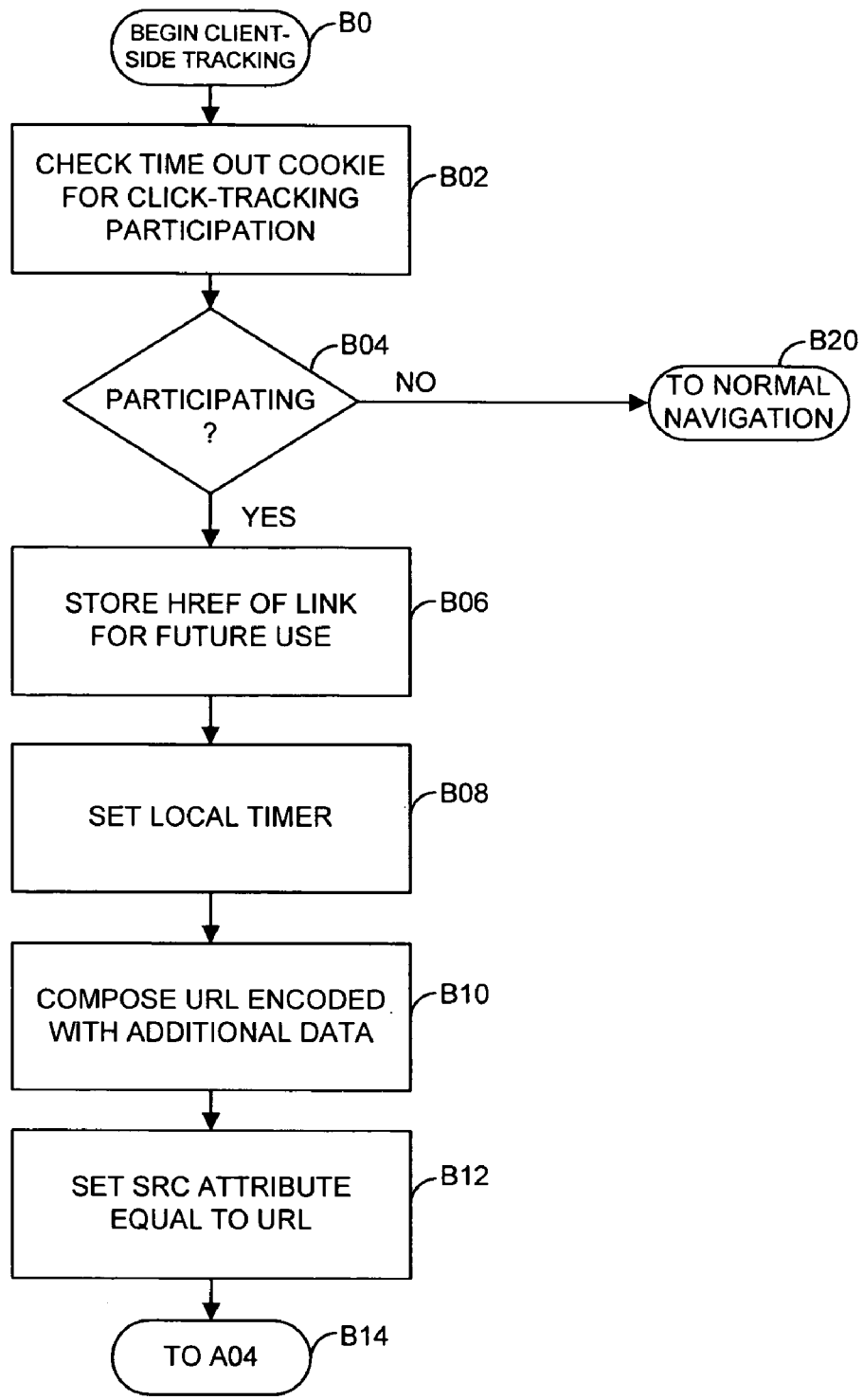
FIG. 6 is a flow chart illustrating details of client-side tracking in accordance with an embodiment of the invention.

As shown in FIG. 6, the tracking method begins client-side tracking in step B0. In step B02, the tracking method checks a timeout cookie for click-tracking participation on the client for the current session. If click tracking is not desired, normal navigation procedures may be followed. If click tracking is desired, the tracking mechanism 210 stores the hyperlink reference of the link as tracking information in step B06 for future use. In step B08, the tracking component using timing components 240 sets a local timer 242 that serves as a timeout for tracking server communication. In step B10, the tracking component 210 composes a URL pointing to the tracking server 400 using the tracking interface 230. The URL is encoded with additional data from the link's data attribute. In step B12, the tracking interface 230 sets an src attribute of the object or element equal to the parameterized URL composed in step B10. This step initiates the actual communication to the tracking server 400 where the encoded data is logged for future use. In step B14, the system returns to step A04 described above.

Returning to FIG. 5, in step A04, the system attaches events including a timeout event and an element load event to client-side callback functions. Subsequently, either an element load event will occur in step A06 or a timeout event will occur in step A08. If the element load event occurs first, the event was a successfully logged click event because the only way for the element to get its true URL is to be redirected by the tracking server. The previously stored href value (the true URL of the link being navigated to) is used to direct the user browser 202 to the final destination. If this is a destination on a site using this same system, the process starts over from step one. Accordingly, the user is directed to the destination in step A12.

If the timeout event occurs in step A08, the timeout event handler 244 is activated in step A10. If the timeout event is called before the element load event, this is considered a timeout of the tracking server 400. The timeout event handler 244 sets a client-side cookie recording the timeout and the previously stored href is used to direct the user browser 202 to the final destination. The cookie is a "counter" of timeouts. When user computer 200 has surpassed the threshold of timeouts allowed, the user session will stop attempting to contact the tracking servers 400, thereby providing a better user experience in the event of tracking server failure or undue network latency. Subsequently, the user is directed to the destination in step A12. The process ends in step A14.

Although embodiments of the invention are described above with reference to the client tracking components 210, the target server 500 may include the server-side tracking mechanism 510 that inspects incoming requests for tracking information such as a cookie that indicates timing out of client in immediately previous request.

Figure 7:
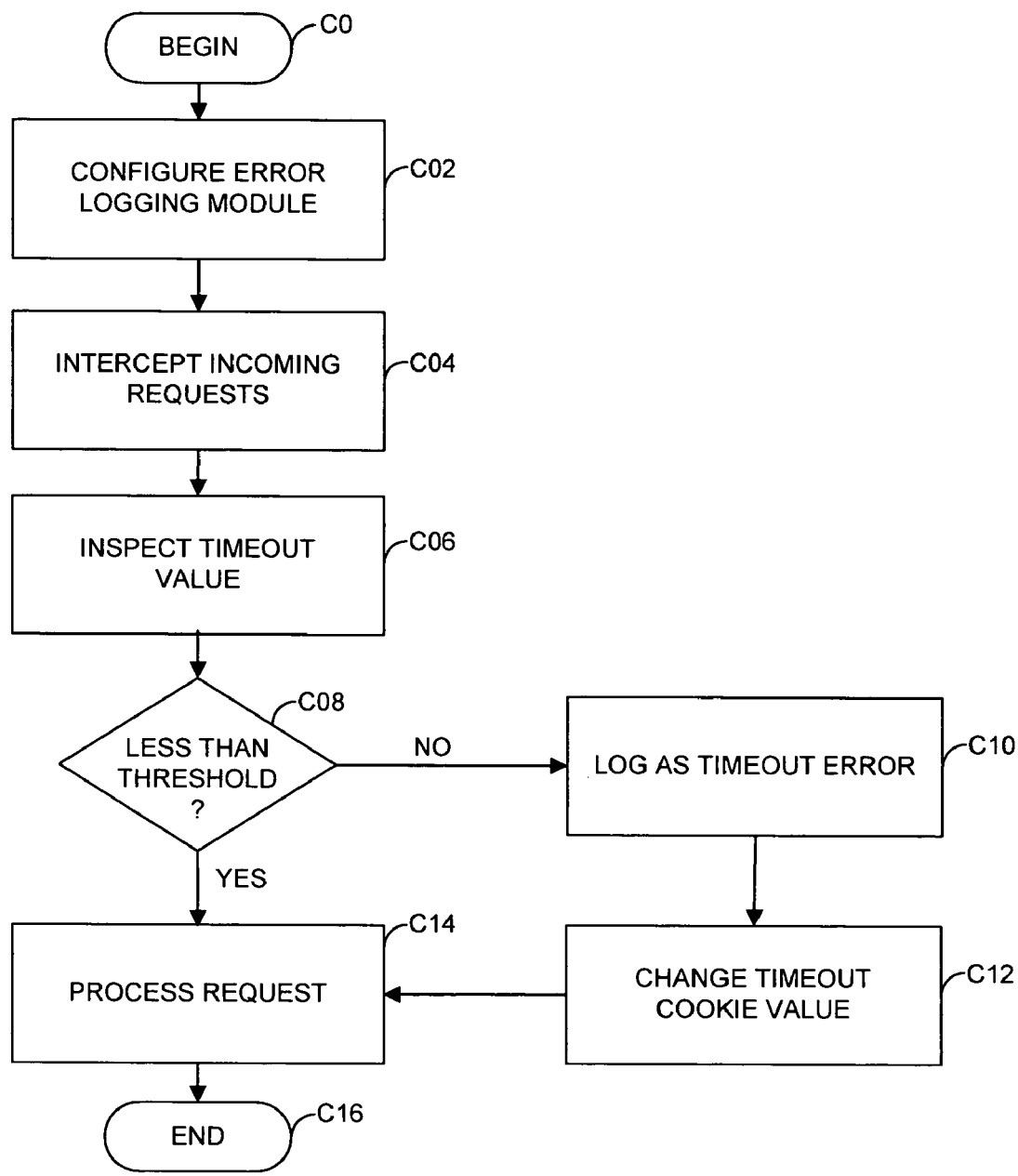
FIG. 7 is a flow chart illustrating server side tracking steps in accordance with an embodiment of the invention.

FIG. 7 illustrates server side events during tracking procedures in accordance with an embodiment of the invention. The process begins in step C0. The server side tracking mechanism 510 configures its error-logging module 320 in step C02. The error-logging module 320 may be configured via the web application's web.config file. This step inserts the error-logging module 320 into the request pipeline and declares any custom logging interfaces required. The error-logging module 320 may intercept incoming requests in step C04 and may inspect a timeout value in step C06. If the timeout value is less than the pre-set threshold in step C08, the error-logging module 320 causes the request to be passed along. If the value of the timeout cookie is equal to or greater than the current threshold, the error-logging module 320 logs a timeout error in step C10.

The logging of the timeout error in step C10 depends upon whether a specific implementation for logging timeouts has been declared. If in the course of configuring the error-logging module 510, there has been a specific implementation declared, the object is instantiated and used to log the error event in a manner specific to the implementation. If no specific implementation has been declared during configuration, then a default logging object may be used. The default-logging object may for example include writing to a system event log.

After the event has been appropriately logged, the value updating component 530 changes the timeout cookie value in step C12 to reflect its logged state. The cookie is retained with this new value so that the client-side tracking mechanism 210 can continue to honor the click-tracking bypass for the appropriate amount of time. In step C14, the server-side tracking mechanism 510 passes the request to other components to be processed normally.

In embodiments of the invention, the above-described logging may be facilitated by insertion of an HTTP Module in the request pipeline of the web application. This module should not interfere with the normal request. Because all of the error reporting needs of all web applications should not be assumed, the logging mechanism provides for a default error logging mechanism as well as the logging mechanism explained above.

As described above, the system of invention allows a user to time out on a request to the tracking server 400 and opt out of the tracking procedure. This system also allows tracking of the number of users who have timed out and this number will be tracked regardless of whether the tracking server 400 is operational and whether any other participating server is aware of the status of the tracking server 400.

In order for the tracking to function properly, links within the system must be properly constructed. This system is capable of tracking which link on a page is clicked on and distinguishing between an identical link if it appears two or more times on a page.

The invention provides a system and method by which a commercial or other type of web site is able to use a redirection or tracking server system for usage tracking, but still be able to show its users the actual URL of the target site. The system additionally allows search engines to more accurately determine the URLs on the pages being indexed. The system and method of the invention may provide levels of self-healing in the event that the tracking servers become unavailable as well as reporting any tracking server failures or system slowdown. Furthermore, the embodiments of the system and method eliminate the requirement for pre-disclosing or registering all possible URLs.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method for incorporating a client-side tracking system in conjunction with a tracking server to track URL usage, the method comprising:
   implementing the client-side tracking system for preserving a target URL upon tracking; and
   providing a failsafe mechanism for directing a client to the target URL from the client-side tracking system upon detection of tracking server failure by the client-side tracking system.

2. The method of claim 1, further comprising embedding an executable component and an element in a server web page.

3. The method of claim 2, wherein providing a failsafe mechanism comprises providing a configurable timer for allowing the tracking server to time out.

4. The method of claim 3, further comprising composing a URL pointing to the tracking server using the client-side tracking system.

5. The method of claim 4, further comprising setting an src attribute of the element equal to the composed URL.

6. The method of claim 5, further comprising attaching events including a timeout event and an element load event to the client-side tracking mechanism and monitoring for event occurrence.

7. The method of claim 6, further comprising determining successful tracking server logging upon detection of the element load event.

8. The method of claim 6, further comprising detecting a tracking server failure upon detection of the timeout event.

9. The method of claim 6, further comprising using stored tracking information on the client-side for directing the user to the selected URL upon occurrence of either event.

10. The method of claim 1, wherein preserving a target URL comprises storing a hyperlink reference as tracking information for future use.

11. A computer readable medium storing computer executable instructions for performing the method of claim 1.

12. A client-side tracking system for use in conjunction with a tracking server for tracking use of a selected URL, the client-side tracking system comprising:
   an event detection mechanism for detecting occurrence of one of a successful tracking server URL logging event and a tracking server timeout event; and
   access to tracking information including a stored target hyperlink reference in the client-side tracking system for directing a client to the selected URL upon detection of an event by the event detection mechanism.

13. The system of claim 12, wherein the client-side tracking system comprises an embedded executable and an element in a server web page.

14. The system of claim 13, further comprising a configurable timer set at a threshold level for allowing the tracking server to time out.

15. The system of claim 14, further comprising a tracking interface for composing a URL pointing to the tracking server and setting an src attribute of the element equal to the composed URL.

16. The system of claim 15, wherein the event detection mechanism detects a successful tracking server URL logging event upon occurrence of an element load event.

17. The system of claim 16, wherein the event detection mechanism detects a tracking server failure upon occurrence of a timeout event.

18. A method for incorporating a client-side tracking system to monitor tracking server processing in order to ensure user access to a selected URL, the method comprising:
   monitoring occurrence of a tracking server timeout in accordance with a selected threshold;

upon occurrence of a tracking server timeout, directing a user to the selected URL using the client-side tracking mechanism.

19. The method of claim 18, further comprising embedding an executable and an element in a server web page.

20. The method of claim 19, further comprising setting an src attribute of the element equal to the composed URL.

21. The method of claim 20, further comprising attaching events including a timeout event and element load event to the client-side tracking mechanism and monitoring for the occurrence of one of the events.

22. The method of claim 21, further comprising determining successful logging upon detection of the element load event.

23. The method of claim 21, further comprising detecting a tracking server failure upon detection of the timeout event.

24. The method of claim 21, further comprising using stored tracking information on the client for directing the user to the selected URL upon occurrence of either event.

25. The method of claim 18, further comprising providing a configurable timer for allowing the tracking server to time out.

26. The method of claim 18, further comprising composing a URL pointing to the tracking server using the client-side tracking system.

27. The method of claim 18, further comprising preserving a target URL by storing a hyperlink reference as tracking information for future use.

28. A computer readable medium storing computer executable instructions for performing the method of claim 18.

29. A client-side tracking system for use in conjunction with a tracking server for tracking use of a selected URL, the client-side tracking system comprising:

a configurable timer for setting a threshold that determines a tracking server timeout on the client-side; and a timeout event handler for recording the timeout and ensuring direction of a user to the selected URL.

30. The system of claim 29, further comprising access to tracking information including a stored target hyperlink reference in the client-side tracking system for directing the user to the selected URL.

31. The system of claim 29, wherein the client-side tracking system comprises an embedded file and an invisible element in a server web page.

32. The system of claim 31, further comprising a tracking interface for composing a URL pointing to the tracking server and setting an src attribute of the invisible element equal to the composed URL.

33. The system of claim 32, further comprising an event detection mechanism that detects a successful tracking server URL logging event upon occurrence of an invisible element load event.

34. The system of claim 33, wherein the event detection mechanism detects a tracking server failure upon occurrence of a timeout event.

\* \* \* \* \*